United States Patent [19]
Bell et al.

[11] Patent Number: 5,167,205
[45] Date of Patent: Dec. 1, 1992

[54] CONVERTIBLE DISPOSABLE ANIMAL LITTER CONTAINER

[76] Inventors: John D. Bell, P.O. Box 100, Simpson, 27879-0100; Kamyar Kheradpir, P.O. Box 401, Greenville, N.C. 27835-0401

[21] Appl. No.: 853,830

[22] Filed: Mar. 19, 1992

[51] Int. Cl.⁵ .................... A01K 1/01; B65D 5/00
[52] U.S. Cl. .................... 119/168; 229/120.1; 229/122; 229/23 A
[58] Field of Search .............. 119/168, 170, 161, 169, 119/165; 229/103, 120.1, 23 A, 122

[56] References Cited

U.S. PATENT DOCUMENTS

| | | | |
|---|---|---|---|
| 2,246,097 | 6/1941 | Illges | 229/23 A |
| 4,348,982 | 9/1982 | Selby | 119/168 |
| 4,530,459 | 7/1985 | Maroszek | 229/23 A |
| 4,792,082 | 12/1988 | Williamson | 119/168 |
| 4,940,016 | 7/1990 | Heath | 119/168 |
| 5,014,649 | 5/1991 | Taft | 119/168 |
| 5,046,457 | 9/1991 | Ashcroft et al. | 119/168 |
| 5,071,010 | 12/1991 | Larufel et al. | 206/23 A |

FOREIGN PATENT DOCUMENTS 2618050  1/1989  France ................ 119/168

Primary Examiner—John G. Weiss
Attorney, Agent, or Firm—Rhodes, Coats & Bennett

[57] ABSTRACT

A disposable animal litter box can be folded into a compact form for storage, shipment, and/or disposal. The pet litter container includes a base made from a first piece of sheet material and an insert made from a second piece of sheet material. The base includes a bottom portion for containing the pet litter, a pair of foldable side panels attached to the bottom portion, and a pair of roof panels attached to the side panels. The insert includes a floor panel which is disposed inside the bottom portion of the base, and a pair of foldable end walls. Together, the base and the insert form an enclosure containing the pet litter.

11 Claims, 4 Drawing Sheets

CONVERTIBLE DISPOSABLE ANIMAL LITTER CONTAINER

BACKGROUND OF THE INVENTION

1. Field of the Invention

The present invention relates generally to the field of animal waste disposal. In particular, the present invention is directed towards a convertible enclosed box structure containing several features allowing the storage and shipment of the litter within the box until needed. Converting the box from its closed form to its open form, permits the animal to use the litter until it is deemed necessary to dispose of the unit. The present invention is then converted back to its original closed form to be disposed of and replaced with another unit of the present invention.

2. Description of the Related Technology

Animal waste disposal for house hold pets, particularly cats and small dogs has been a sanitation and convenience problem for which a number of solutions has been sought. The most common solution to the above problem is utilization of plastic open containers with typical dimensions of one foot by one and a half feet by two to five inches filled with water and odor absorbent materials such as clay, wood chips, or shredded paper. The above containers were place in the house for animals to use until the absorbent material would be deemed unable to absorb fluids and odors any more. The container at this stage is normally emptied of its contents and washed so that it can be filled with fresh absorbent material. Movement of the animals in and out of the container and their digging action in the container usually causes the contaminated absorbent material to transfer outside of the container. Also emptying and washing the container involves human contact with the contaminated absorbent material. Both of the actions above can cause diseases or allergies in humans and contribute to health problems in pregnant women. The used absorbent material in some cases is not disposed of on time due to lack of attention on the pet owners part or their reluctance to proceed with the action of emptying and washing the container. Animals are forced to continue using the same used litter which is a health hazard to them or they seek other places in the house to be used as their litter area.

A number of solutions to the above problems have been sought in part by design of disposable animal or cat litter boxes. These designs form a large variety of devices in the art of disposable litter containers, and they include devices disclosed in the following listed U.S. Pat. Nos.: 3,154,052, 4,441,451, 3,377,990, 4,501,226, 3,684,155, 4,541,360, 3,743,170, 4,548,160, 4,014,292, 4,627,382, 4,164,314, 4,628,863, 4,271,787, 4,646,685, 4,305,544, 4,648,349.

The above devices share some common features which presented improvements over the original plastic litter container. However they still have potential for improvements. These designs do not feature a closed or contained top, leaving the contaminated litter exposed to free flow of air, direct sunshine, and are accessible to young children. There is no evidence of attempts to cover the unsightly contaminated litter from direct vision. They also require that the litter is provided and poured into them separately, which is not a convenient feature. The above mentioned typically employ sophisticated or complicated production techniques for their production, in some cases this feature proves to be cost prohibitive.

U.S. Pat. No. 4,348,982 provides an improved solution to the above problems, yet it does not convert to a closed, easy to transport and disposal form.

U.S. Pat. No. 4,711,198 employs a plastic liner and a plastic carrying handle which are not biodegradable, it also is an open top container.

U.S. Pat. No. 4,776,300 provides a good solution to the above problem, yet non-biodegradable parts and complicated production techniques make it costly and less desirable for the land fills.

U.S. Pat. No. 4,788,935 utilizes a non-biodegradable plastic bag, and it is too confining for most animals, yet it is an improvement over the previously mentioned designs.

U.S. Pat. No. 4,801,006 presents an open top container with variable height of litter. This height can be too shallow and allows the litter to be poured out of the container by the animal during the digging action, too deep so that some younger cats hesitate to use it. The individual layers of litter are not enclosed for disposal. This device also uses more corrugated board than most of other disposable animal litter box designs encountered.

U.S. Pat. No. 4,884,527 presents an improved solution to the mentioned problems, yet it employs complicated construction and assembly techniques, provides only one entry hole, and does not offer a carrying handle which can be used while the container is in the open form.

U.S. Pat. No. 4,792,082 is another improvement, however, it lacks a carrying handle, and offers only one opening for the animal. Experiments show that contaminated litter can leak out of the container through seam between front wall and side wall (3 and 2 in FIG. 2 of the disclosed patent). This design wall (3 and 2 in does not efficiently utilize the original corrugated blank from which FIG. 2 is cut.

U.S. Pat. No. 4,913,091 produces even more non-biodegradable material than the above mentioned U.S. Pat. No. 4,788,935. Beside the plastic bag, supports 43 and 44 are required to be made out of plastic or similar material, which contribute to higher production costs.

U.S. Pat. No. 4,981,104 is another efficient approach to the above problems. It utilizes the original corrugated blank more efficiently, thereby reducing production costs, and does not call for plastic parts. This design offers only one entry hole for the animal, and the shape of the roof is too confining for most cats making it difficult for them to assume squatting position. No carrying handle is provided by this device.

U.S. Pat. No. 4,932,360 shares some common features with U.S. Pat. No. 4,913,091 and 4,788,935 and therefore imposes the same problems of non-biodegradability, higher production costs and difficulty of transportation due to lack of a carrying handle.

U.S. Pat. No. 4,940,016 suggests a more sophisticated solution to the above problems than most of the above patents. However, because the bottom of the container is not solid and is formed out of four folding flaps, the litter may leak out while being used by the animal. Flap 110 in the accompanying drawings suggests application of adhesives for manufacturing, this step may complicate production especially when combined with adhering the bottom flaps together. The design provides only one opening for entrance and exit of the animal, possibly making it experience confinement. Openings 80 and 82 may not be used to pick the container up for transportation since tabs 35, 37, 46, and 44 are not designed to support tension loads caused by the weight of the litter in the container. Moreover the possibility of litter leakage through the seams formed by side panels and front or back panels is not eliminated.

U.S. Pat. No. 4,986,217 approaches the above problems in part similar to U.S. Pat. No. 4,940,016 with the exception of a carrying handle. Panels 26, 30, 34, and 38 in the accompanying drawings present a stability problem, since there are no attachment provisions to part number 52, there is a possibility of container collapse while being used by the animal.

U.S Pat. No. 5,014,649 presents a number of improvements over the previously encountered designs by utilization of two corrugated panels to form the floor of the container, and thereby reducing the possibility of litter leakage. Still the entrance and exit door provided on the side panel of the container does not ease the access of the animal to the litter box. Moreover only one access door is provided. The design does not provide any lifting handles for transportation. This design also calls for application of adhesives for attachment of bottom panels as well as the top cover, hence increasing the production cost and complexity.

U.S. Pat. No. 5,046,457 addresses the problem with perhaps one of the best solutions in the patents studied. Application of only one corrugated board to build this device results in a single layered container floor construction which offers less resistance to moisture and loads with respect to an equivalent double layer construction. The said design also requires the end user to construct the container, and therefore making itself less convenient to utilize. The said device does not collapse to a closed form for ease of disposal, a feature which is almost a requirement if the end user resides in an apartment or where trash disposal containers are shares by many other residents.

Consequently, there is a need for a disposable pet litter container which is relatively inexpensive to manufacture, made wholly out of biodegradable corrugated material, with a double layer floor construction, more efficient seals, one that does not require large shipping space by having a small volume while not in use, one that features a carrying handle so that it can be easily used by people on automobile trips, one that is not too complicated to assemble and use, and easy to convert back to its original position for easy disposal.

SUMMARY OF THE INVENTION

The present invention is a convertible disposable animal litter box with a carrying handle, which is intended to be manufactured out of two corrugated boards or similarly stiff and biodegradable material, and shipped with sufficient amount of moisture absorbent material such as clay, wood chips or shredded paper to the end consumer. The said invention is capable of being converted from a closed form, in which it does not allow its contents to leak out and occupies a relatively small volume, to an open form in which it can be used by animals as a relief station due to its larger volume, and again back to its original form in which it occupies less volume and prevents the leakage of contaminated litter, for disposal.

This Invention comprises two corrugated boards or similarly stiff, foldable, and biodegradable material. One of the said forms the base of this invention and the other forms the insert. The base forms the lower floor layer, front and back lower walls, side walls, the roof halves, the handle, the locking tabs for the lower walls, and the locking tab and slot for the handle. The insert forms the front and back walls and their openings, deflection flaps, locking roof tabs, second layer of the floor, and side folding flaps. The insert also provides stability for the container.

The said invention provides a stiff moisture barrier floor for its occupants by employing two corrugated boards (parts of the base and the insert) or similarly biodegradable and stiff material, covered with moisture repellent coating as the major components forming its floor. Furthermore, this invention employes folding flaps attached to the sides of its insert as means of resistance to the leakage of litter while the container is being used.

The present invention features a locking tab which locks the two parts of its roof and forms a carrying handle.

This invention is not intended to be assembled together using glue, adhesive tapes, staples, rivets or any type of non-biodegradable fasteners.

BRIEF DESCRIPTION OF THE DRAWING

The present invention may be more readily Understood from the following detailed description when taken in conjunction with the accompanying drawing in which:

FIG. 2 is an isometric drawing showing the litter box in its closed form, when it can be either shipped or disposed of.

DESCRIPTION OF THE PREFERRED EMBODIMENT

Figure 1:
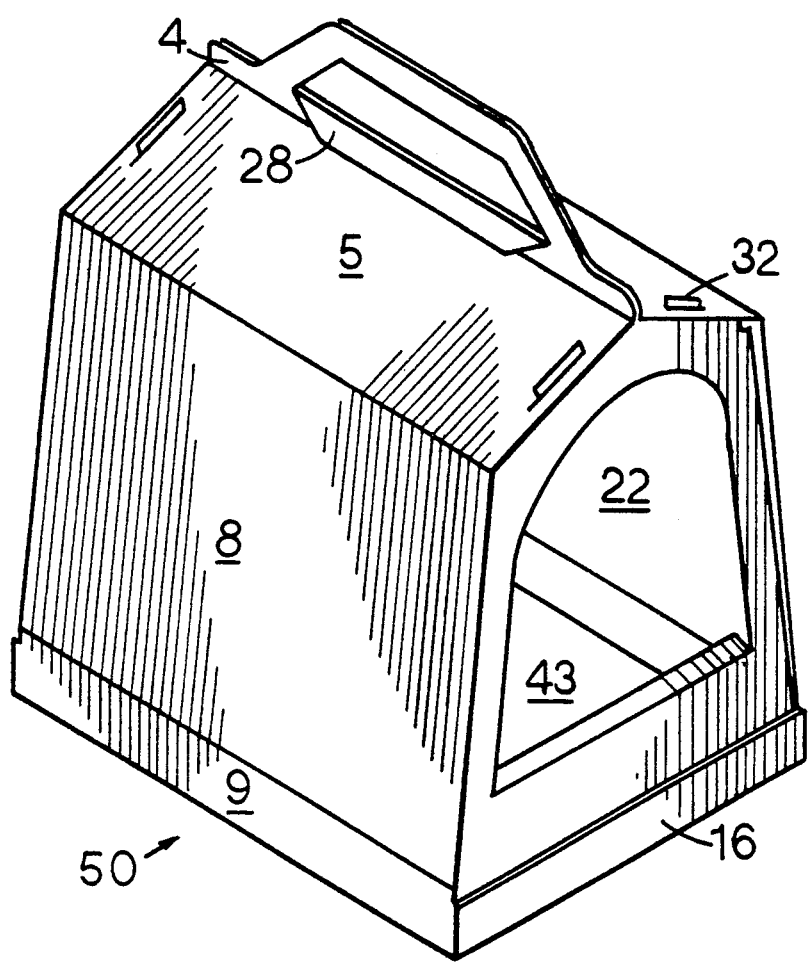
FIG. 1 is an isometric drawing of the convertible disposable animal litter box showing the litter box in its open form, ready to use or transport by the carrying handle.

Generally comprising a convertible disposable animal litter container aparatus 50, according to present invention as depicted in FIG. 1 are a base 1, and an insert 31. The base 1 comprises lower floor layer 17, front and back walls 16, four locking tabs 14, and their corresponding slots 15, two side walls 9 and 20 two side panels 8 and 22, two roof panels 5 and 25, two carrying handles 4 and 27, the interlocking roof/handle mechanism flap/tab 28 and slot 2, four locking flaps 11 and 18, four roof slots 6 and 24, fold lines 10, 19, 21, 13, 12, 31, 7, 26, and 29; and carrying handle opening 3.

The insert 31 comprises upper floor layer 43, front and back insert walls 41 and 45, front and back panels 39, and 47, two entrance and exit openings 36, deflector flaps 37 and 49, four seal flaps 35, four relief cuts 33, four locking tabs 32; and folding lines 42, 40, 38, 34, 44, 46, and 48.

Figure 4:
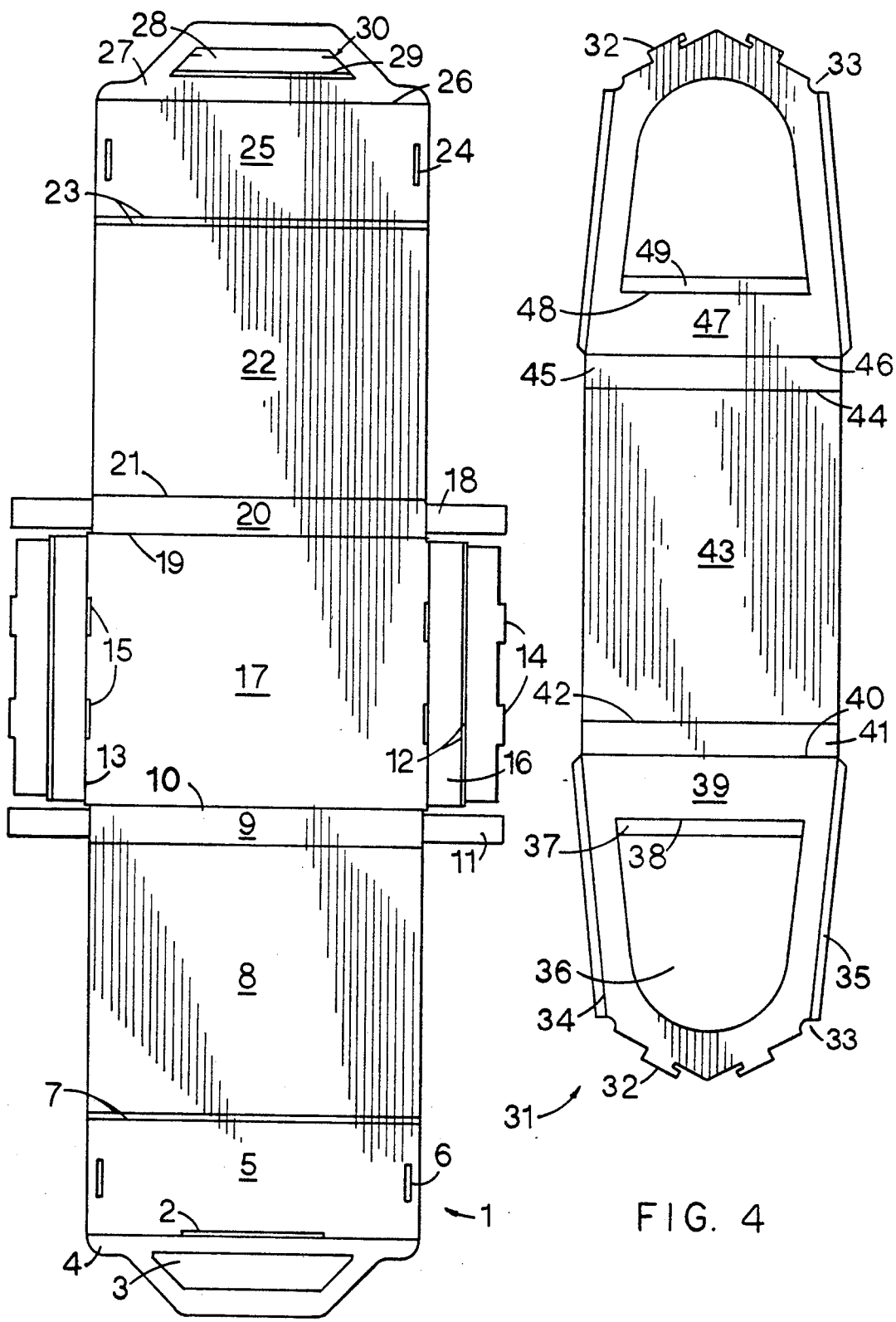
FIG. 4 is the diagram of the two components of the litter box and represents their true geometrical relationship.

Generally comprising a convertible disposable animal litter container aparatus 50, according to the present invention as shown in FIG. 1 are a base 1, and an insert 31. The base is preferably made out of a corrugated cardboard blank or similarly stiff, biodegradable, and foldable material. Furthermore the base is covered with a coating of water resistant material on both sides, or alternatively on only one side. The base is converted in to a litter container by folding walls 9 and 20 upward with respect to lower floor layer 17 along folding lines 10 and 19, and then folding flaps 11 and 18 along folding lines 31 toward each other; consequently the front and back walls 16 are folded along fold lines 12 and 13 so that flaps 11 and 18 are positioned between the folded walls 16, and finally tabs 14 are inserted in to slots 15 to secure the shape of the container. This process is repeated for the opposite side of base 1 (not numbered, FIG. 4).

Insert 31 is preferably made out of corrugated card board or similarly stiff biodegradable, and foldable material. Furthermore the said part is covered with a coating of water resistant material prior to assembly. Insert 31 is folded symmetrically upward with respect to the upper floor layer 43 along fold lines 42 and 44. Then the insert 31 is placed inside the partially assembled base as explained above, so that floor layers 43 and 17 form a double layered floor for the apparatus; and insert walls 45 and 41 come in contact with front and back walls 16. The front and back panels 39 and 47 are then folded along fold lines 40 and 46 toward each other. Seal flaps 35 are next folded inward along fold line 34 so that entire insert 31 fits inside the said partially assembled base.

The litter material (clay, wood chips, or shredded paper) is poured in to the said assembly through the entrance/exit openings 36. The litter material is supplied sufficiently so that the container reaches its maximum capacity. This typically for a container of 18 inches length, 14 inches width and 2.5 inches height is about 7 to 10 pounds of clay or 3 to 5 pounds of wood chips.

Figure 2:
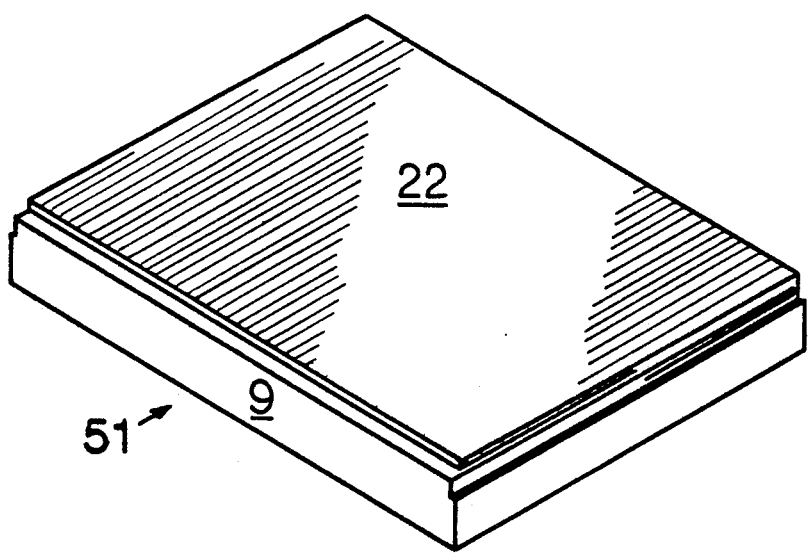
Figure 3:
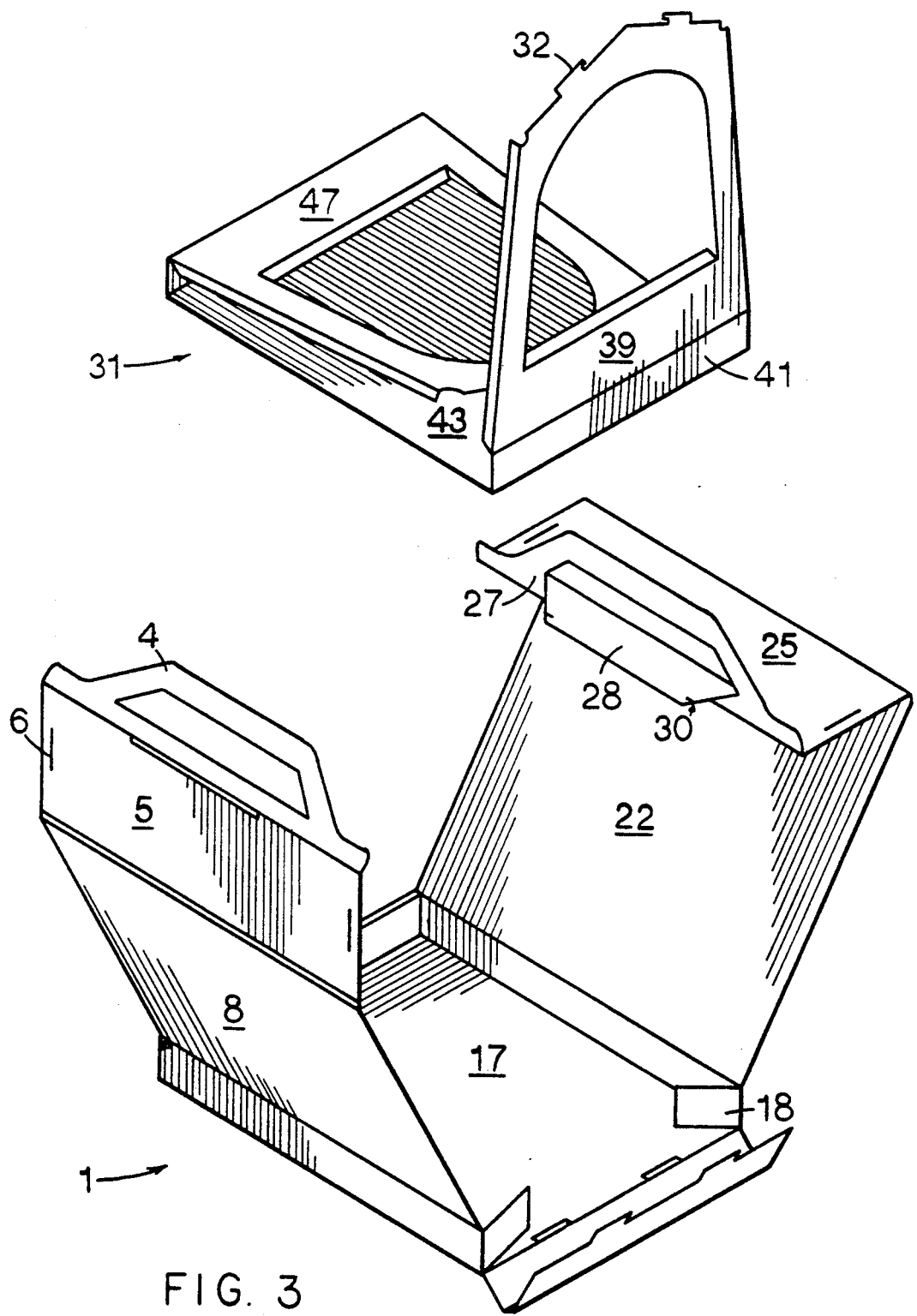
FIG. 3 is an isometric drawing of the litter box components and their spatial relationship

Next roof panels 5 and 25 are folded inward toward each other along fold lines 23 and 7. Then side panels 22 and 8 are folded inward toward each other along fold lines 21 so that they form a cover for the said assembly as shown in FIG. 2. At this stage, the entire assembly can be placed in a plastic shroud which shrinks and thereby seals the assembly of FIG. 2, or simply taped shut to achieve the same purpose. The above operation is preferably done by the manufacturer prior to shipping to the retailer or the end user.

In order to convert the present invention from its closed form as shown in FIG. 2 to its open form as shown in FIG. 1, side panels 8 and 22 are unfolded along folding lines 21 so that they form two approximately parallel planes perpendicular to floor layers 17 and 43. Then roof panels 5 and 25 are unfolded so that carrying handles 4 and 27 come in to contact with each other, and flap/tab 28 can be folded along fold lines 29 so that it in turn can be inserted in to slot 2 to form a temporary lock, holding the roof panels 25 and 5 together for the duration of use. Cuts 30 are made sufficiently deep in to flap 28 so that the distance between the two cuts is equal to the length of slot 2. The said feature resists forces causing separation of the two carrying handle pieces 27 and 4.

Figure 6:
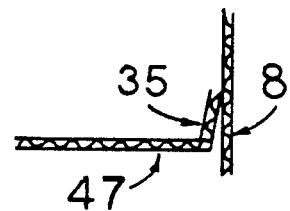
FIG. 6 is the cross-section drawing of the side seal flaps and the adjacent side wall.
Figure 7:
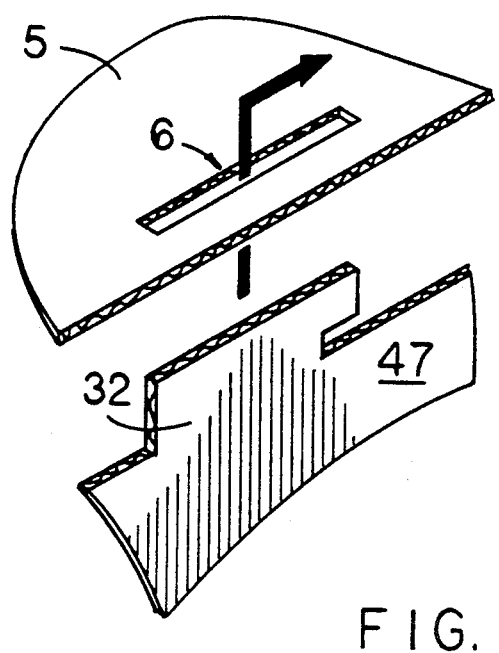
FIG. 7 is the detail drawing of the locking insert tabs.

Second step to be taken by the user to convert the present invention to its open form as shown in FIG. 1 is to pull front and back panels 39 and 47 from horizontal position to vertical position and inserting locking tabs 32 in to roof slots 6 and 24 (as shown in FIG. 7.) This arrangement results in stability of the entire device. The four (4) sealing flaps 35 form vertical seals between front and back panels 39 and 47, and side panels 22 and 8 against leakage of litter or contamination to the outside environment as shown in FIG. 6.)

Entrance and exit openings 36 are provided for both front and back panels 39 and 47 in order to avoid producing the feeling of confinement in the animal, furthermore having two openings provides better access for the animal to the said device.

Figure 5:
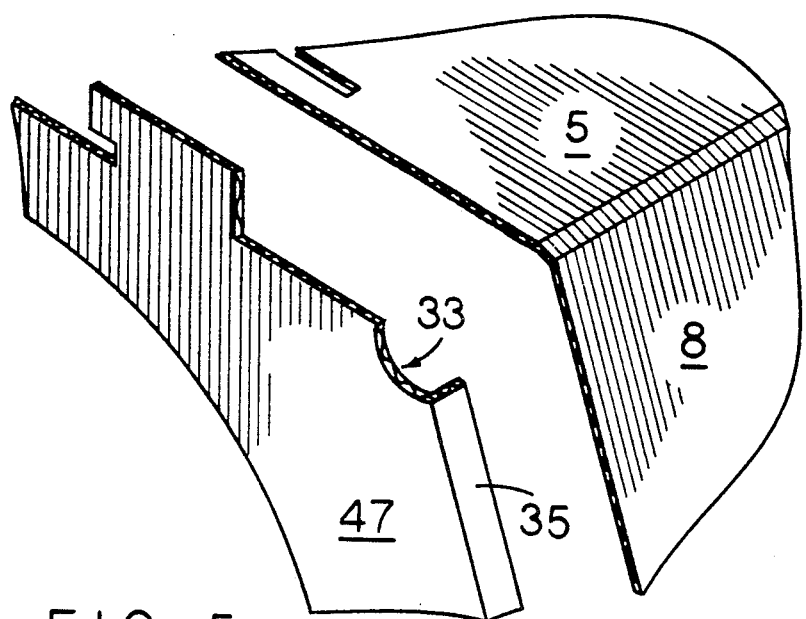
FIG. 5 is the isometric drawing of the roof panel and side panel juction, showing the details of the stress relief cut out and the sealing flap.

The relief cuts 33 as indicated in FIG. 5, located on the four corners of insert 31 are intended to relief stresses caused while locking tabs 32 are being inserted in to their corresponding slot.

Deflector flaps 37 and 49 are folded along folding lines 38 and 48 to deflect litter, contamination, or debris back to the litter area while this device is being used by animals. These flaps are allowed to fold back and forth freely upon contact with animal body parts. The height of the said flaps is about five inches from the upper floor leyer, thereby providing adequate depth for the litter container. This is one of the advantages of application of the insert 31, since without it either the container would have been only two inches high, making it easier for the litter to spread outside, or it would have been five inches high in order to avoid the leakage of the litter, thereby using more material and wasting shipping space.

The present invention as described above can be used for pets, particularly cats as a relief station for until the pet owner (end user) deems necessary to replace the unit. The above invention can be lifted by its carrying handle and transported or taken on an automobile trip. The present invention is not intended to be used as an animal carrying case. The present invention can be converted back to its closed form by pulling the locking tabs 32 out of their corresponding roof slots 24 and 6, folding front and back panels 39 and 47 in to the base of the container, pulling flap 28 out of slot 2, folding roof panels 25 and 5 along folding lines 7 and 23, folding side walls 8 and 22 toward each other so that they form a cover for the container, and taping the device shut or using the optional tab 51. The device is ready at this stage to be place in the trash bins or trash chutes or other means of trash disposal.

The present invention does not employ any adhesives for its construction or assembly, however using shrinking plastic film or adhesive tapes is optional. The device can be held together by other means prior to shipping or disposal such as rubber bands or cotton threads. It is intended for this invention to be completely biodegradable so that it would not contribute to the present land fill shortage problems.

Typical dimensions for the present invention are 18 inches length (length of fold line 19), 14 inches width (length of fold line 13), 2 to 2.5 inches height in the closed form (width of 9), 18 inches height when in open form.

The corrugated material is to be white or similarly suitable color for printing instructions, advertisement or other commercial messages. Alternatively the present invention can be made out of natural brown corrugated card board, with the said information printed on a sheet of paper which may or may not cover more than one wall or panel when adhered to the corrugated boards.

While there have been described above what are at present considered to be the preferred embodiments of the invention, it will be understood that various changes and modifications may be made wherein without departing from the spirit of the invention. The scope of the invention is indicated by the appended claims.

What is claimed is:

1. A disposable, collapsible pet litter container for a pet comprising:
   (a) a base made from a first piece of sheet material and having a use position and a folded position for storing the base in a compact position, the base including a bottom portion having two opposing sides, a front and a back, for containing pet litter; a pair of foldable side panels having a lower edge and an upper edge, said side panels being secured along their lower edges to the opposing sides of the bottom portion so as to be movable between a folded position in which the side panels are folded against the bottom portion in overlapping fashion and a use position in which the side panels extend upwardly from the bottom portion; and a pair of roof panels secured along the upper edges of the side panels, said roof panels including means for interlocking with one another such that the side panels and roof panels form an enclosure over the bottom portion having two open ends; and
   (b) an insert made from a second piece of sheet material including a floor panel having front and back edges disposed inside the bottom portion of the base; a pair of foldable end panels secured to the front and back edges of the floor panel and movable between a collapsed position in which the end panels are folded against the floor panel and a use position in which the end panels extend upwardly from the floor panel, said end panels including means for interlocking with the roof panels of the base and at least one end panel having an opening therein to provide the pet access into the litter box.

2. The pet litter container of claim 1 wherein the bottom portion includes a generally rectangular bottom panel having opposing side edges, a front edge, and a back edge; a pair of side walls extending vertically upward from the side edges of the bottom panel; and a pair of end walls extending vertically upward from the front and back edges of the bottom panel; and means for connecting the side walls with the front and back walls to form a continuous peripheral wall structure surrounding the bottom panel.

3. The pet litter container of claim 2 wherein the end walls have an exterior member attached to the bottom panel and an interior member attached to the exterior member, and wherein the connecting means included connecting flaps connected to the ends of the side walls that extend between the interior and exterior members of the front and back walls.

4. The pet litter container of according to claim 3 wherein the exterior members of the front and back walls are secured along one edge to the front and back edges of the bottom panel respectively, and along an opposite edge to a respective interior members, said interior and exterior members being folded against one another in side by side relationship.

5. The pet litter container of claim 4 wherein the interior member includes means for interlocking the interior member with the bottom panel.

6. The pet litter container of claim 5 wherein the interlocking means for the interior member comprises a locking tab extending from the interior panel and a corresponding slot in the bottom member for engaging and securing the locking tab.

7. The pet litter container of claim 1 wherein the roof panels each include an attached handle, and wherein the attached handles are positioned adjacent to each other when the base is in a use position.

8. The pet litter container of claim 1 wherein the means for interlocking the roof panels includes a securing flap extending from one roof panel and a slot disposed in the opposite roof panel, and wherein the securing flap extends a slot disposed in the opposite roof panel, and wherein the securing flap extends through the slot to secure the roof panels and attached roof panels together in a use position.

9. The pet litter container of claim 1 wherein the end panels of the insert include deflector flaps for engaging the side panels of the base to prevent cat litter from escaping between the end panels of the insert and the side panels of the base.

10. The pet litter container of claim 1 a deflector flap that extends around at least a portion of the opening in the end panel so as to prevent cat litter from escaping through the opening.

11. The pet litter container of claim 1 wherein the means for interlocking the end panels of the insert with the roof panels of the base includes locking tabs extending from the end panel and engagement slots located in the roof panels such the locking tabs are insertable into the engagement slots to connect the end panels to the roof panels and interlock the base with the insert.

* * * * *